(12) United States Patent
Lim

(10) Patent No.: US 11,117,451 B2
(45) Date of Patent: Sep. 14, 2021

(54) MOTORIZED VEHICLE VISOR

(71) Applicant: Stephen Sophorn Lim, Desert Hot Springs, CA (US)

(72) Inventor: Stephen Sophorn Lim, Desert Hot Springs, CA (US)

(73) Assignee: Stephen S. Lim, Desert Hot Springs, CA (US)

( * ) Notice: Subject to any disclaimer, the term of this patent is extended or adjusted under 35 U.S.C. 154(b) by 24 days.

(21) Appl. No.: 16/442,528

(22) Filed: Jun. 16, 2019

(65) Prior Publication Data

US 2020/0391579 A1 Dec. 17, 2020

(51) Int. Cl.
*B60J 3/02* (2006.01)

(52) U.S. Cl.
CPC .......... *B60J 3/0208* (2013.01); *B60J 3/0234* (2013.01); *B60J 3/0278* (2013.01)

(58) Field of Classification Search
CPC . B60J 3/02; B60J 3/0204; B60J 3/0208; B60J 3/0213; B60J 3/0234; B60J 3/0239; B60J 3/0265
USPC .................................. 296/97.4, 97.12, 97.13
See application file for complete search history.

(56) References Cited

U.S. PATENT DOCUMENTS

| | | | | |
|---|---|---|---|---|
| 5,350,212 A | * | 9/1994 | Corn | B60J 3/0208 296/97.11 |
| 6,237,984 B1 | * | 5/2001 | Cross | B60J 3/0208 296/97.4 |
| 8,246,099 B2 | * | 8/2012 | Lee | B60J 3/0208 296/97.4 |
| 2010/0201149 A1 | * | 8/2010 | Frotz | B60J 3/0208 296/97.4 |
| 2012/0146357 A1 | * | 6/2012 | Huang | B60J 3/0208 296/97.6 |
| 2016/0023541 A1 | * | 1/2016 | Barna | B60J 3/0208 296/97.2 |
| 2019/0135090 A1 | * | 5/2019 | Lim | B60J 3/0208 |

* cited by examiner

*Primary Examiner* — Jason S Daniels

(57) ABSTRACT

A motorized vehicle visor system, which expands and contracts about a central body; pitches towards and away from the windshield, and pivot towards the side window of the vehicle about a supporting rod. The visor can truncate to a shorter width and pitch upward at body position trailing the rod pivot motion towards the side of the window of the vehicle. When pivoted to the side window, the visor system expands, contracts, and pitches towards or away from the side window. In a reverse movement, the visor system truncates into a smaller width, pitch upward at body position trailing the rod pivot motion away from the side window, and pivots towards the frontal position along the windshield. The visor panel system, when in non-operation mode, may truncates about its body, rest in a plane position parallel to the roof of the vehicle. The visor panel system can operate manually.

5 Claims, 7 Drawing Sheets

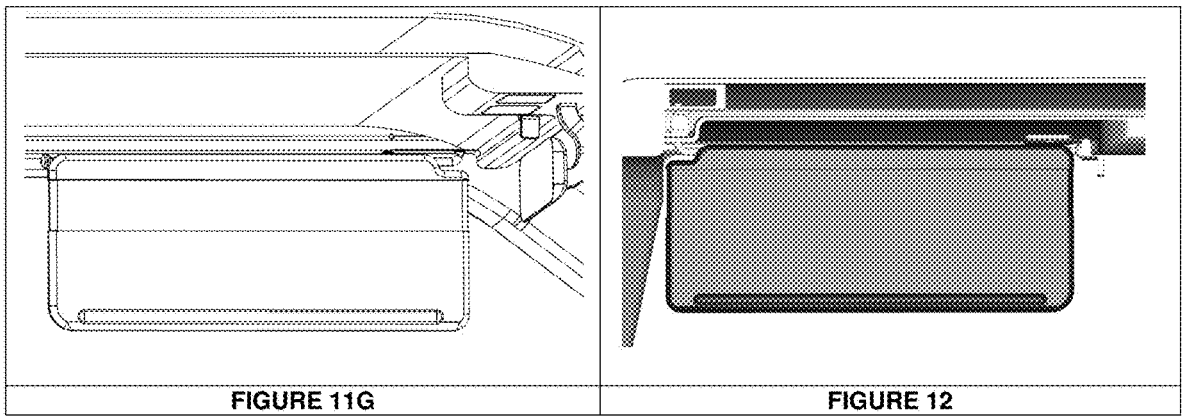

MOTORIZED VEHICLE VISOR

CROSS-REFERENCE TO RELATED APPLICATION

U.S. Pat. No. 10,308,098
File Date: Nov. 7, 2017

FEDERALLY SPONSORED RESEARCH

Not Applicable

SEQUENCE LISTING OR PROGRAM

Not Applicable

BACKGROUND OF THE INVENTION

Field of Invention

The scope of this invention is to supersede some of the design of an existing Electric Assist Vehicle Visor of U.S. Pat. No. 10,308,098, to further develop for more compact and effective design for shading application and/or blocking strong sunrays. There calls for another approach of developing a new vehicle visor with a new design model. Implementing the same concept of motor operation within the visor, the belt and pulley was minimized from previous design adding more of the gears into the system and major modification is implementing a direct motor drive application into the integrated vehicle visor body panel instead of the belt driven of previous design.

The telescoping motion of the previous Electric Assist Vehicle Visor was eliminated in the horizontal motion or motion along the suspending rod axis of the partitioned visor; the new design motion takes on a new partition in the vertical setting for vertical motion to take part making it slimmer in the body width for the integrated visor panel. Three partial visor panels are partitioned, comprises of the pivot section, mid section, and extended section; with the extended section transforming the width of the panel body, as expansion and truncation takes motion when operated. Where the partial extended panel motion normal from the suspending round bar axis and mid section panel. The extended feature is an application to optimize shading or blocking sunrays when using the integrated visor panel.

With the slim visor panel width, at first operation, motion counters the roof of the vehicle; the truncated visor panel mode is pitched to travel in an angular motion at about the fixed end axis of the suspending round bar for shading application to block sunrays at window side. With modifications implemented to these new design approaches, from expanding to truncating to hold and release to direct motor system with manual operation capabilities, the new visor supersedes to the name as Motorized Vehicle Visor.

Description of Prior Invention

Within the existing product of U.S. Pat. No. 10,308,098, the visor telescopes horizontally along the round bar that suspends along the bar axis. When shading application to motion to the side window is in operation, the visor panel truncates inward along the bar axis to shorten the length, where it pitches upward towards the roof to pivot towards the side windows. When in position, the visor extends to the original length to shield from disturbing sunrays and/or extends for optimal shading. A feature of a magnetic suspension to one end of the visor delivers a reinforcement to secure the visor in position when in rest mode and/or shading is needed along the windshield. The feature of the design appears effective but requires a new design approach, where superseding are implemented to the new Motorized Vehicle Visor or MVV.

Other motor driven visor in existence is of U.S. Pat. No. 7,493,933 of Li that implements gears, sprocket and chain drive system, where shading is in the form of a scroll like structure to take cover the windshield. Such design may be allocated to when the vehicle is stationary but the idea is of unique deliverance. The design implementing gears, sprocket and chain drive system is similar standard for motion components of a product but contrary to the Motorized Vehicle Visor, the belt, pulley, and gears are implemented within the main frame and along with a direct drive to the round bar that suspends the integrated vehicle visor.

Objects and Advantages

The Motorized Vehicle Visor advantage is like that of the previous Electric Assist Vehicle Visor, where a motor controls the motion of visor panels and/or manual operation. The difference for the Motorized Vehicle Visor is the design structures and compact aesthetic design, where the visor appears more effective when the direct motor drive gear system are utilized to allow the integrated vehicle visor to pivot at about the round bar axis that suspends the visor panel.

The feature of expanding and contracting of the width of the integrated vehicle visor panel delivers another advantages to the MVV, where the visor pivoting towards the roof at a truncated width while motion to the side window may provides room clearance between operator and roof of the vehicle; the development base from the existing visor of everyday vehicle on the road observation. The feature also provides an optimum shade or blockage of sunrays by the expanding feature of the visor; where the width of the integrated vehicle visor gradually increase in size with the help of the electric motor and/or operator manually motion the visor to the expansion feature.

Another advantage of the integrated vehicle visor of the Motorized Vehicle Visor is option for superseding the from the magnetic suspension of the previous design to a more controllable solenoid actuating system, which function for hold in place and release with the releases handle and/or manual operation for the integrated vehicle visor panel disengagement from the front windshield to motion to the side window when shading or sunrays blocking is essential for action.

SUMMARY OF THE INVENTION

The design of the Motorized Vehicle Visor structural components cover for both the driver and passenger area of the vehicle, but in this application, the driver side of the integrated vehicle visor panel is designed and develop to cover for both, the driver and passenger side. As both the driver and passenger implements the same the interior mechanical components and structures for the Motorized Vehicle Visor; with the differences may be in the parts and/or components for mounting and/or assembling onto the passenger side and/or affixed the integrated vehicle visor to vehicle frame. Where for the visor application, is mounted within the roof and windshield edges, section of the vehicle. The MVV have the capability to implement electric to power the motors within the Main Frame [200] of the integrated vehicle visor, and as well as the solenoid actuating system; and with the option to operate manually.

The Motorized Vehicle Visor is designed with an improvement development in mind from U.S. Pat. No. 10,308,098, which previous designs supersede for new approaches. The new design for the partition of the integrated panel is in horizontal position or along the Main Round Bar [222] of the visor, which integrated visor panel is segmented into three partial panels, the Extended Section [202], Mid Section [204], and the Pivot Section [206]. The notion for this partition is to make the width of the integrated visor panel or Motorized Vehicle Visor slim in a horizontal setting. The approach of this partition enhances optimal shading by method of expanding or contracting the visor panel vertically; in addition, assist with ease in motioning the integrated visor to the side window.

Within the integrated visor panel, there's a compartment that allows for an option to implement the magnetic suspension from previous design. In FIG. 10 illustrates how it looks with the new integrated vehicle visor panel design. Observing within the MVV panel, at the Main Round Bar [222] end, the Metal Cylinder [226] is placed followed by the Round Cylinder Screw [228]. The Round Cylinder Screw [228] is a new option that secures the integrated vehicle visor in place of a hold and release. When at rest or in operation, the Solenoid Coil Actuator [264] system with the Solenoid Rod [265] disengaging the Release Handle [260] or the Release Handle [260] can be disengage manually, allowing for the integrated vehicle visor panel to motion out of the hold position, which the visor may pivot to the side window. Details illustrated in FIGS. 9 to 9A and FIG. 11C to 11D, for the integrated vehicle visor to motion to the side windows, when the solenoid actuation system disengages the Release Handle [260] to free the Round Cylinder Screw [228].

BRIEF DESCRIPTION OF THE DRAWINGS

Some of the figure drawings are illustrated to contain the same reference numbers and with different assembly views to better describe the Motorized Vehicle Visor.

FIG. 11G shows the motorized visor panel, at the window side of the vehicle is extended to various width.

FIG. 12 shows the motorized vehicle visor panel at the frontal view, where the width of the visor is at full extension in a color rendering illustration.

Figure 1:
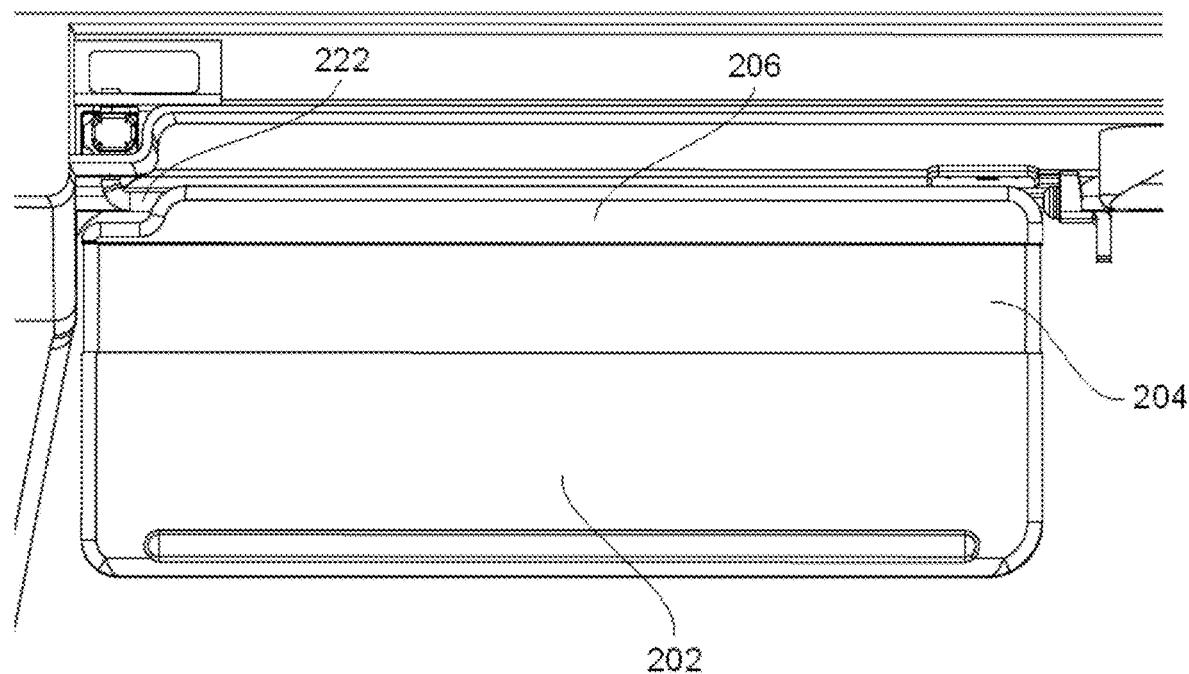
FIG. 1 illustrates the motorized vehicle visor in three-dimensional drawing, supported with a motor mounted at the roof and windshield area of the vehicle suspends a round bar shaft supporting the integrated vehicle visor, with the extend portion of the panel expanded normal to the round bar shaft to deliver various widths for shading application.

| DRAWINGS - Reference Numerals | | | |
|---|---|---|---|
| 200 | Main Body Frame | 202 | Extended Section |
| 204 | Mid Section | 206 | Pivot Section |
| 210 | Motor Mount | | |
| 212 | Round Bar Lock Ring | 213 | Round Bar Lock Ring Insert |
| 214 | Round Bar Spacer | 216 | Bevel Gear |
| 218 | Motor and Pinion Gear | | |
| 220 | Angle Round Bar | 222 | Main Round Bar |

| DRAWINGS - Reference Numerals | | | |
|---|---|---|---|
| 223 | Main Round Bar Insert | 224 | Main Bar Gear |
| 226 | Cylinder Metal | 228 | Round Cylinder Screw |
| 229 | Round Cylinder Screw Insert | | |
| 230 | Direct Mount Track | 231 | Direct Motor and Pinion |
| 232 | Direct Motor Spacer | 233 | Connector Gear and Post |
| 234 | Tension Spring | 235 | Tension Spring Bolt |
| 236 | Direct Motor Mount Glider | 237 | Tension Spring Glider |
| 238 | Glider Tension Bolt | 239 | Direct Motor Insert |
| 240 | Extended Motor Track | 241 | Extended Motor Mount Glider |
| 242 | Extended Motor | 243 | Timing Belt Gear |
| 244 | Timing Belt | 245 | Timing Belt Gear Mount |
| 246 | Top Rubber Stop | 247 | Support Glide Bar |
| 248 | Bottom Rubber Stop | 249 | Extended Motor Insert |
| 250 | Extended Frame | 251 | Timing Belt Grip |
| 252 | Extended Travel Bar | 253 | Extended Travel Bar Insert |
| 254 | Extended Support Bar | 255 | Extended Support Bar Insert |
| 256 | Support Glide Bar Insert | | |
| 260 | Release Handle | 262 | Release Return Spring |
| 264 | Solenoid Coil Actuator | 265 | Solenoid Rod |
| 266 | Release Case Housing | 268 | Release Case Cover |

DETAILED DESCRIPTION OF THE INVENTION

FIG. 1—Embodiment

An embodiment of like structure of the MVV invention in FIG. 1 derives an integrated vehicle visor panel that is partitioned into three portion panels, which partition panel comprises of the Extended Section [202], Mid Section [204], and Pivot Section [206]. The integrated vehicle visor or panel is suspends on a Main Round Bar [222] shaft that is motorized to assist when desired. The panels are assembled to allow the Extended Section [202] to extend or travel normal from the Mid Section [204] and Pivot Section [206] for greater shaded area desired when operated by a controller and/or manually by the operator's hand.

FIG. 2—Embodiment

Figure 2:
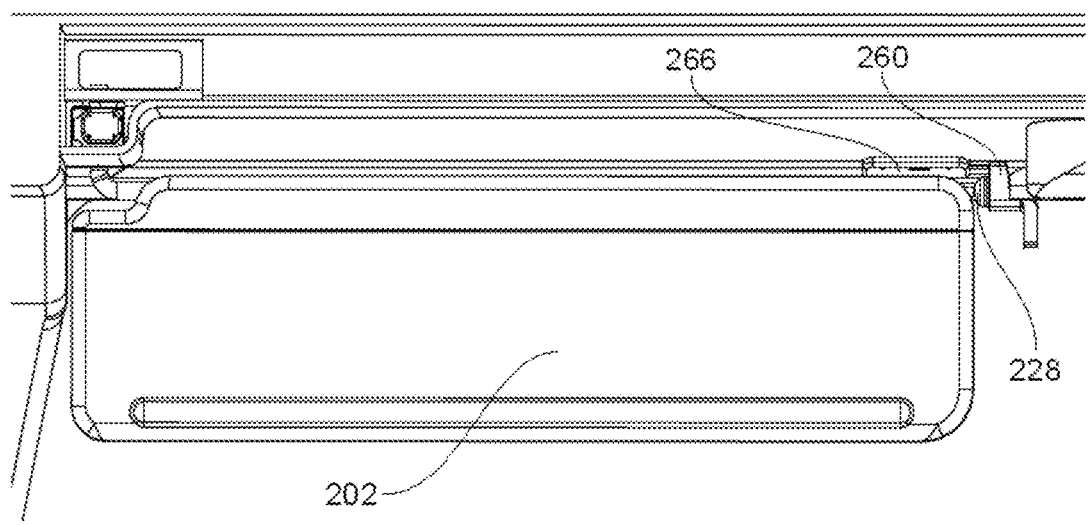
FIG. 2 shows the contracted panel that is supported by a round bar shaft; with one end mount fixed with a motor to the interior of the roof and the other end held by a handle/solenoid actuator system imbedded within the roof panel.
Figure 9:
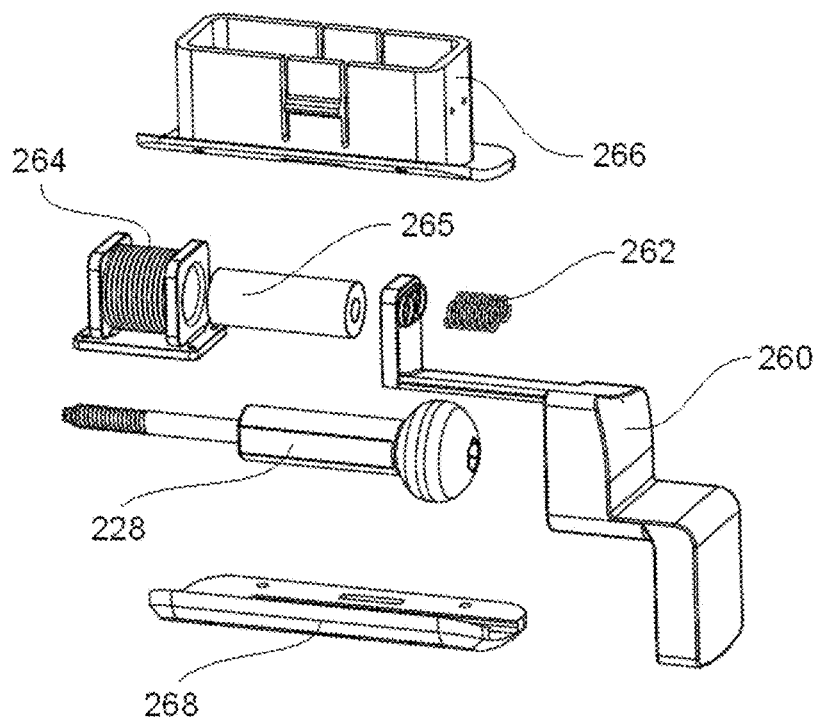
FIG. 9 shows the solenoid actuator system with components for the suspending end of the visor for the integrated vehicle visor panel to disengage for pivot motion to the side window.
Figure 9A:
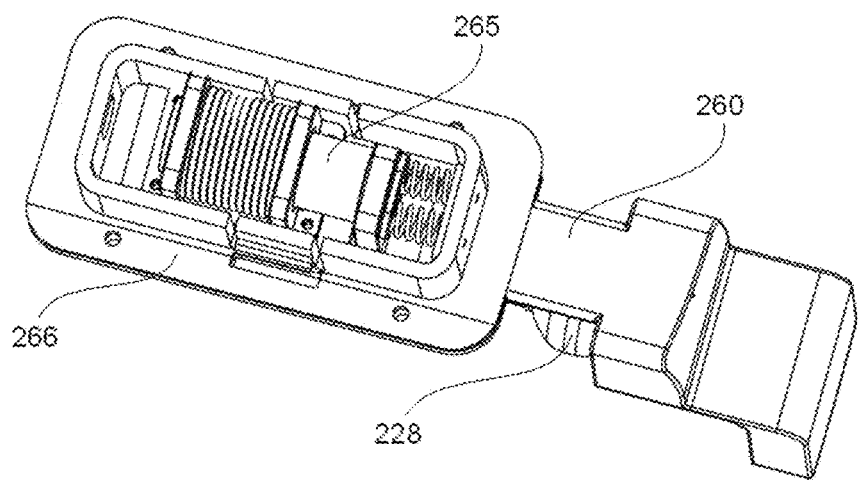
FIG. 9A illustrates the assembled solenoid actuator and release handle for disengaging the suspending visor to motion in an angular horizontal motion or pivot to the side window.

An embodiment of like structure of the MVV invention as shown in FIG. 2 details the integrated vehicle visor at first mode of operation, pivots from the roof; which the Extended Section [202] contracts cover the Mid Section [204] at smaller width of the visor panel. The visor panel is suspended by a Main Round Bar [222] shaft with the motor affixed within the roof and windshield side of the vehicle, allows for an angular horizontal motion to take part when controlled to the window side. The other end of the Main Round Bar [222] shaft is the Round Cylinder Screw [228], held in place by a Release Handle [206] and Release Case Housing [266] that contains the Solenoid Coil Actuator [264], Solenoid Rod [265], and Release Springs [262], which details are illustrated in FIGS. 9 and 9A.

FIG. 3—Embodiment

Figure 3:
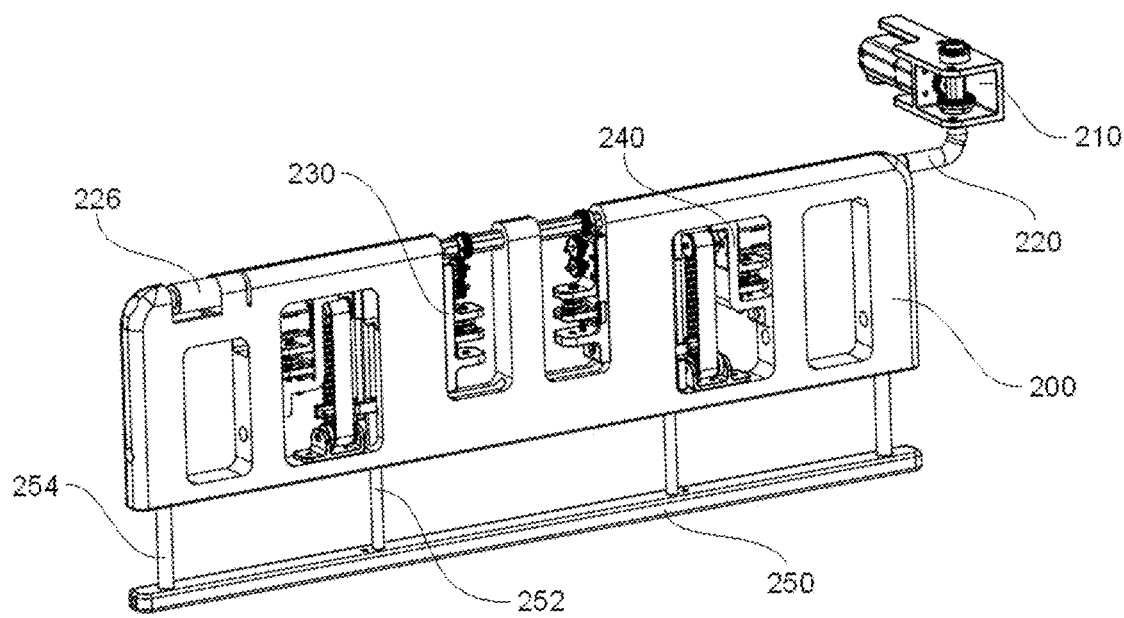
FIG. 3 illustrates the interior assembly with the operating motors, gears, belts and gear pulleys with spring tensioning of the Motorized Vehicle Visor.

An embodiment of like structure of the EAVV invention in FIG. 3 derives the interior components of the integrated vehicle visor, which comprises of the Main Body Frame [200], Extended Frame [250], and Main Round Bar [222] shaft system. Within the Main Body Frame [200], fitted within the compartments, are two sets of the Direct Mount Track [230] that houses the motor and components, and two sets of the Extended Motor Track [240] that houses the motor and components for extending the visor in vertical motion, normal the Main Round Bar [222] shaft system, which details are in FIGS. 5 and 6. The Extended Frame [250] comprises of the Extended Travel Bar [252] and Extended Support Bar [254], all are connected to the Main Body Frame [200]; which Main Body Frame [200] suspends along the Main Round Bar [222], Angle Round Bar [220], and Cylinder Metal [226], where the angled end is harnessed to the Motor Mount [210], that is affixed to the inner roof driver and windshield area of the vehicle frame, which details of the Main Round Bar [222] shaft and associated assemblies are in FIG. 4.

FIG. 4—Embodiment

Figure 4:
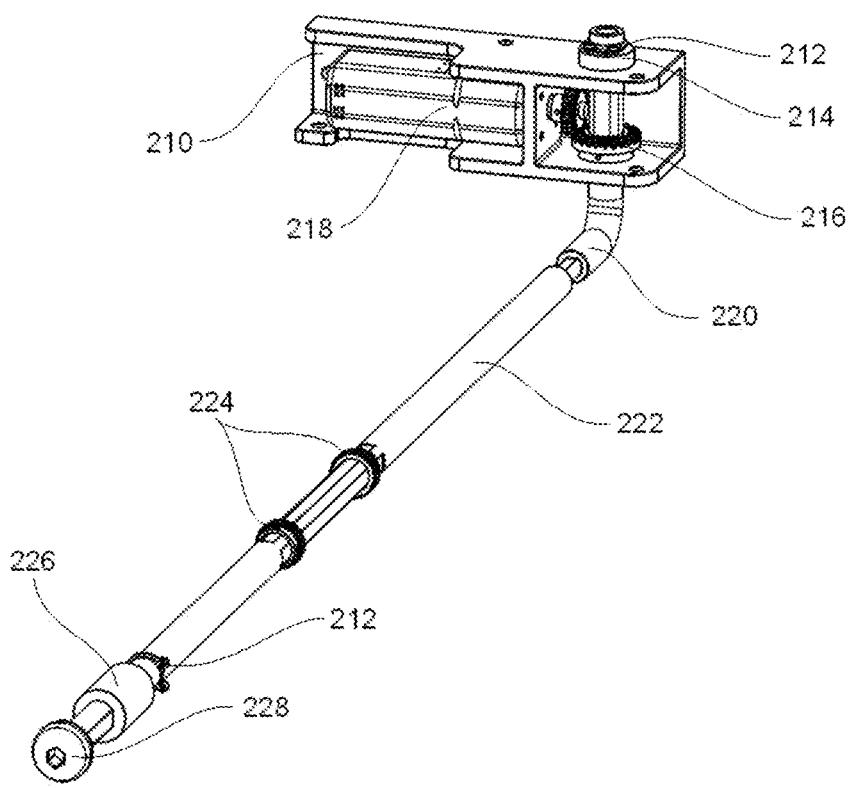
FIG. 4 shows an assembly of the round bar shafts with direct drive gears components to pivot the visor panel at about the round shaft bar and with and assembled mount bracket that houses the motor, pinion gear, and bevel gear for an angular horizontal motion of the visor.

An embodiment of like structure of the MVV invention in FIG. 4 illustrates an assembly of the Main Round Bar [222] shaft, which houses a set of the Main Bar Gear [224] set followed by a slot for the Round Bar Lock Ring [212] to keep in place the integrated vehicle visor and inserts of the Cylinder Metal [226], completing the end with Round Cylinder Screw [228]. The Main Round Bar [222] is inserted with the Angle Round Bar [220], where the short angle end houses the Motor Mount [210] casing the Motor and Pinion Gear [218] and Bevel Gear [216] to complete the assembly at motorized end with the Round Bar Spacer [214] and Round Bar Locking Ring [212] securing in place.

FIG. 5—Embodiment

Figure 5:
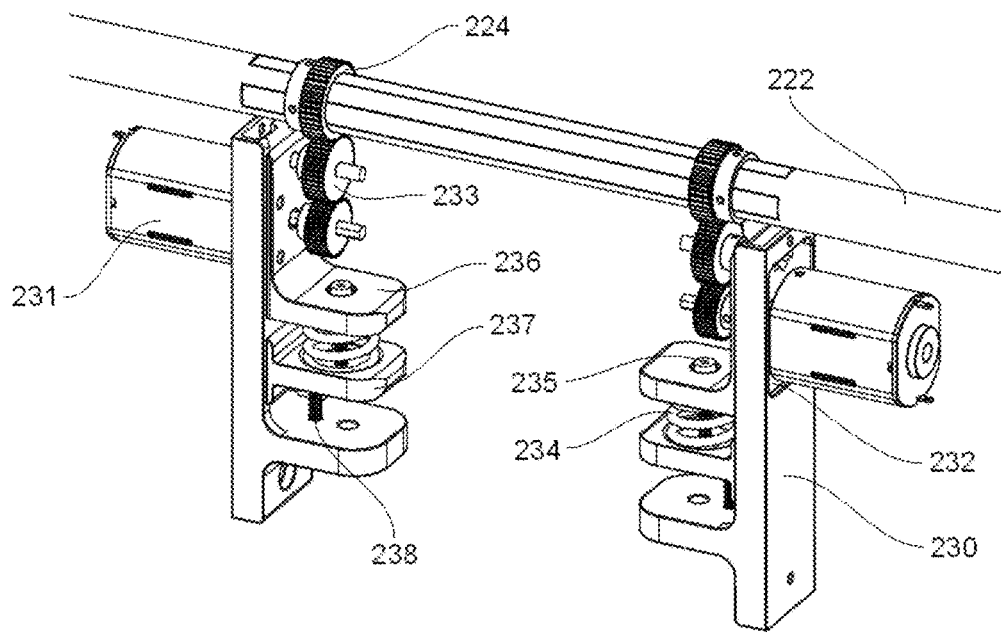
FIG. 5 details the dual direct motor drive systems to pivot at about the round bar shaft to motion the integrated vehicle visor panel, where the motor mount that glides within a track bracket with spring tension and tension adjuster.

An embodiment of like structure of the MVV invention in FIG. 5 illustration detailed along the Main Round Bar [222] shaft are two sets of the Direct Mount Track [230] that houses within the track, the Tension Spring Glider [237] with connection in between, a Tension Spring [234] secured by a Tension Spring Bolt [237] to the Direct Motor Mount Glider [336]; all tensioned by the Glider Tension Bolt [238] that attaches to the Direct Mount Track [230] derives a direct motor drive system. The Direct Motor Mount [336] cases the Direct Motor and Pinion [231] followed by Direct Motor Spacer [232] along with the Connector Gear and Post [233] to complete the Direct Mount Track [230] direct motor drive system. There drives the Main Body Frame [200] of the integrated vehicle visor, at about the Main Round Bar [222] shaft that hosts the two Main Bar Gears [224] to lock in position, for the Main Frame Body [200] pivot are when electric current is given to the direct motor drive system.

FIG. 6—Embodiment

Figure 6:
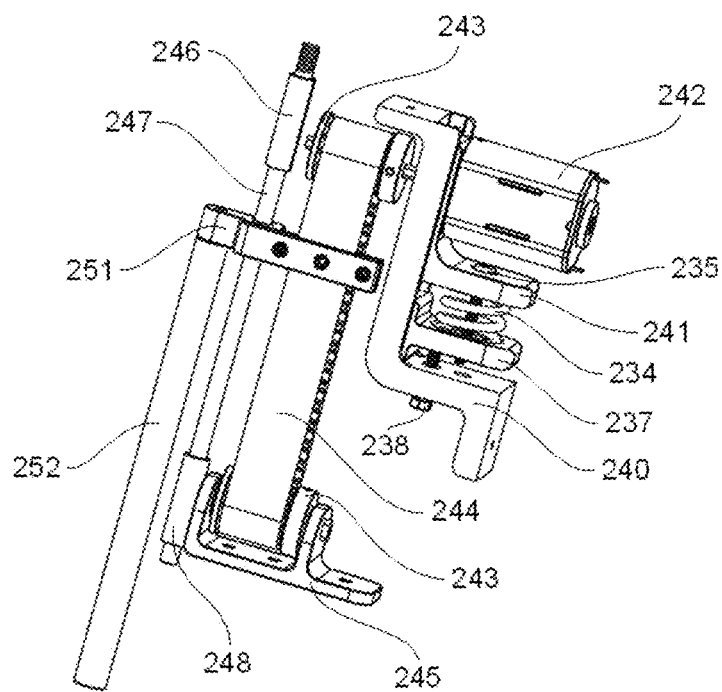
FIG. 6 details the drive system for the contracting and expanding of the visor panel for vertical motion; where the motor drives the belt is harnessed a belt grip to a travel bar, which the belt grip is supported by a smaller rod for stability.

An embodiment of like structure of the MVV invention in FIG. 6 details an assembly of the Extended Motor Track [240] system for vertical motion or motion normal to the Main Round Bar [222] shaft of the integrated vehicle visor. There comprises of the same glide assembly as the Direct Mount Track [230] component system in FIG. 5, where the Tension Spring Glider [237], Tension Spring [234], Tension Spring Bolt [235], and Glider Tension Bolt [238] along with the Extended Motor Mount Glider [241] derives the extended drive system. The Extended Motor Mount Glider [241] houses the Extended Motor [242], which is connected to the Timing Belt Gear [243] to the Timing Belt [244] to the Timing Belt Gear Mount [245] belt system to drive the Timing Belt Grip [251] in vertical motion or normal to the Main Round Bar [222] shaft of the integrated vehicle visor, allowing for the Extended Travel Bar [252] to transfer distances, with the Support Glide Bar [247] to secure as a Timing Belt Grip [251] as track. The Supported Glide Bar [247] is posted screwed within the compartment of the Main Body Frame [200] along with the Direct Mount Track [230]; where each end, top is fitted with the Top Rubber Stop [246] and bottom with the Bottom Rubber Stop [248], to allow distance protection to each of the Timing Belt Gear [243].

FIG. 7—Embodiment

Figure 7:
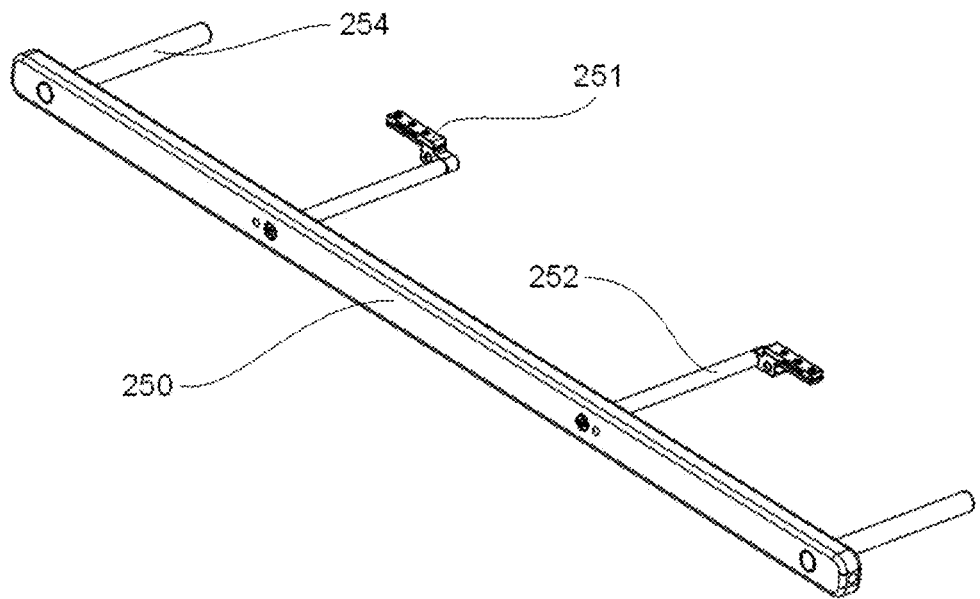
FIG. 7 is an assembly of the frame of the extended panel components, with the travel bars and supported bars at each end.

An embodiment of like structure of the MVV invention in FIG. 7 derives the Extended Frame [250] assembly, where the structure is comprised of two sets of the Extended Travel Bar [252] attaches to the endings with the Timing Belt Grip [251]. At each lateral end of the Extended Frame [250] post the Extended Supported Bar [254] that guides the extending frame within the Main Body Frame [200], when traveling in the vertical motion of the Main Frame [200] or normal to the Main Round Bar [222] shaft.

FIG. 8—Embodiment

Figure 8:
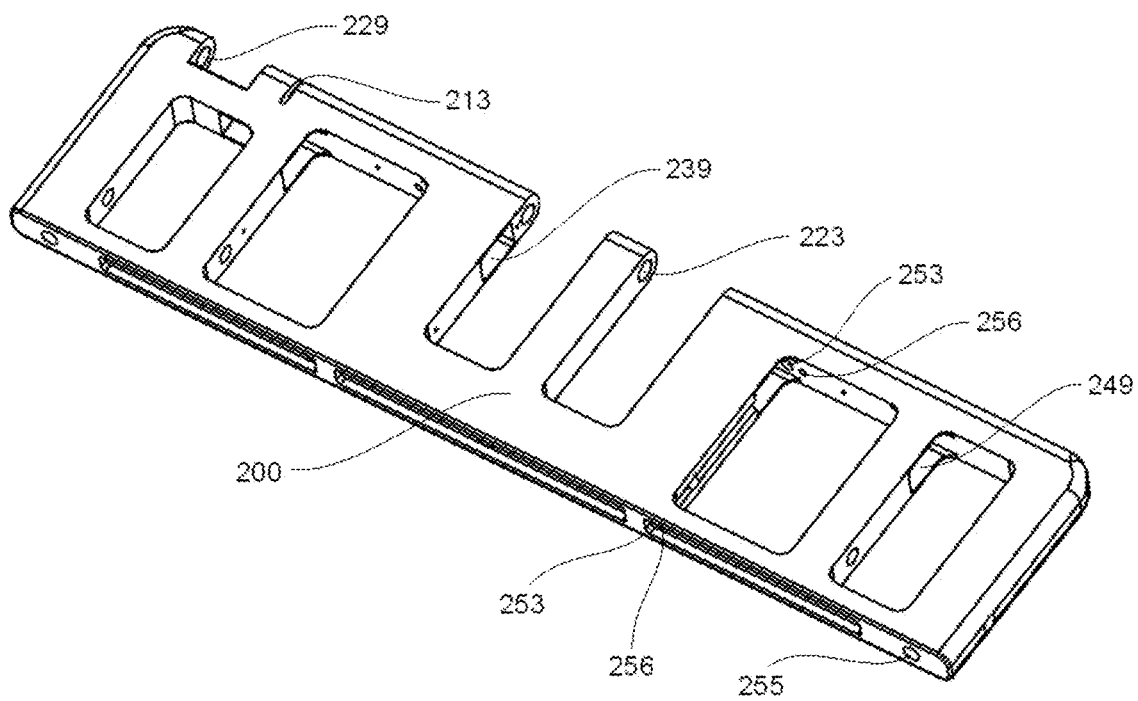
FIG. 8 is the interior frame of the visor panel with inserts for structure bars inserts, motor cavities and compartments for use and compartments for non-use application to reduce weight to the panel.

An embodiment of like structure of the MVV invention in FIG. 8 details the Main Frame [200] structure with many compartments, comprise of the Round Cylinder Screw Insert [229], which allows for the Round Cylinder Screw [228] to secure the Cylinder Metal [226] to the Main Round Bar [222] shaft. The Round Bar Locking Ring Insert [213] secures the Main Frame [200] in place, allowing for a rotational motion at about the Round Bar [222] shaft. The Direct Motor Insert [239] allows for the Direct Mount Track [230] and component of the direct motor drive system to be placed, the Direct Motor and Pinion [231] inserts into place within the Main Frame [200]. The Main Round Bar Insert [223] shaft, which is one of the inserts for the Main Round Bar [222] shaft fits into the inserts within the Main Frame [200]. The Extended Motor Insert [249], which cavities allow for Extend Motor [242], a component assembled with the Extend Motor Track [240] and other components deriving an extended drive system, to fit into place within the Main Frame [200]. The Extended Travel Bar Insert [253] allows for the Extended Travel Bar [252] to travel along with the Extended Support Bar [254], when the extended drive system is in operation. The Support Glide Bar Insert [256] allows for the Support Glide Bar [247] to fit into the inserts within the Main Frame [200] for securing the Extended Travel Bar [252] where the Timing Belt Grip [251] travels. The Extended Support Bar Insert [255] allows for the Extend Support Bar [254] to secure the post when motioning within the Extended Frame [250] assembly system.

FIG. 9-9A—Embodiment

An embodiment of like structure of the MVV invention in FIG. 9 exposes the solenoid actuating system in exploded views, that mounts on and into the roof of the vehicle, for which solenoid actuator releases the Round Cylinder Screw [228] of the Main Round Bar [222] shaft system motorized end to rotate at horizontal motion or roof plane. The solenoid actuator system comprises of the Release Case Housing [266], which houses the Release Handle [260], Release Return Spring [262], the Solenoid Coil Actuator [264] and the Solenoid Rod [265]; a Release Case Cover [268] secures the solenoid actuating release system. A complete assembly in FIG. 9A views from the top of the actuator, an unexposed view when assemble within the roof of the vehicle; exposing partial are the Release Handle [260] and the Round Cylinder Screw [228], which screw is separate system acting to secure the Main Round Bar [222] shaft system in place from pivoting horizontally when in non-operation mode.

FIG. 10—Embodiment

Figure 10:
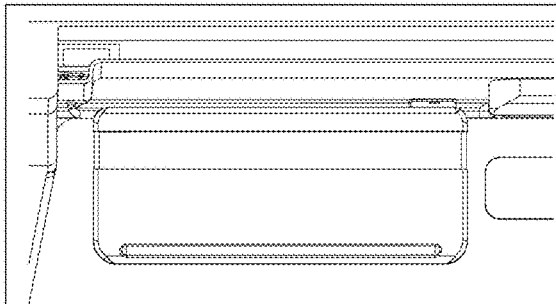
FIG. 10 illustrates the visor panel supported by a magnetic system used in previous patent and is capable for this design, suspends the integrated vehicle visor freely of connection at the non-mount end of the round bar shaft.

An embodiment of like structure of the MVV invention in FIG. 10 illustrates an option for a magnetic suspension where within the integrated visor panel along the Main Round Bar [222] shaft system of the integrated vehicle visor systems to contain a compartment for the Cylinder Metal [226], feature of previous design, with a roof mount magnet placed at the same location where the Release Case Housing [266] houses the Solenoid Coil Actuator [264], Solenoid Rod [265], Release Return Spring [262], Release Handle [260] and Release Case Cover [268] mounts.

Figure 11:
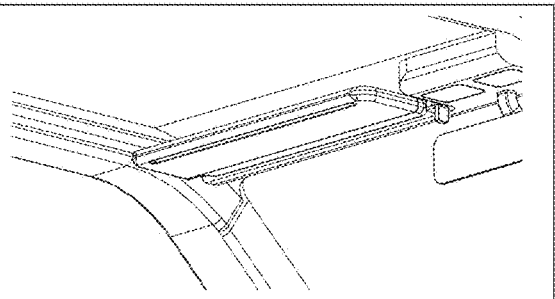
FIG. 11 shows the visor panel in non-operation or rest mode.
Figure 11A:
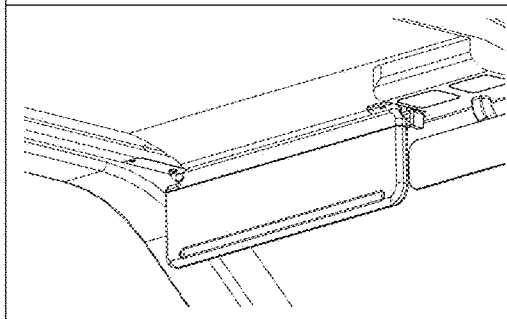
FIG. 11A illustrates the first phase of operation, where the visor panel can be electronically controlled to pivot towards or away from the windshield.
Figure 11B:
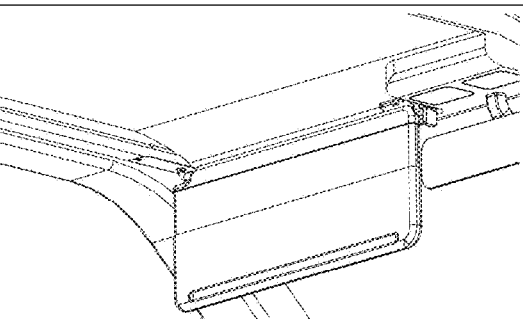
FIG. 11B shows the other phase of operation where the panel can electronically control the extension of the panel in vertical motion.
Figure 11C:
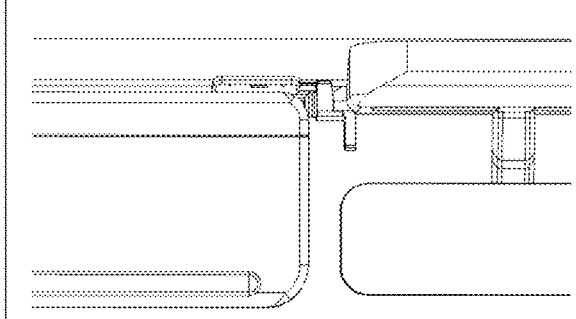
FIG. 11C details electronically controlled solenoid actuator and/or manually release handle, in non-operation or at rest mode.
Figure 11D:
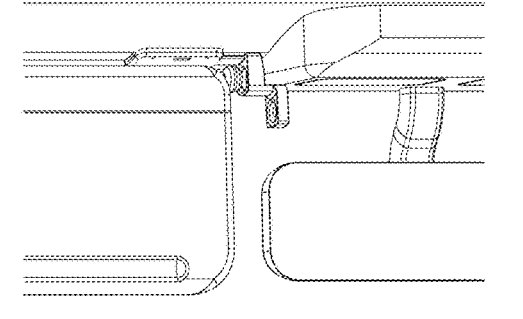
FIG. 11D illustrates the electronically controlled solenoid actuator and/or manually release handle, in operation disengages the release handle allowing for the panel to pivot in horizontal motion when desired.
Figure 11E:
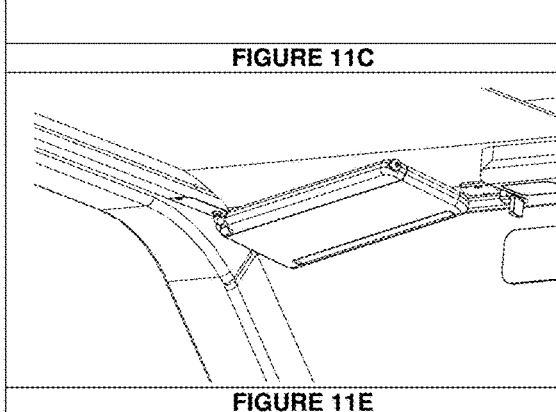
FIG. 11E illustrates the angular horizontal motion of the visor panel after the solenoid actuator disengages the release handle for motion, with the visor panel to motion towards the window of the vehicle as the panel pitches towards the roof for better clearance for the operator.
Figure 11F:
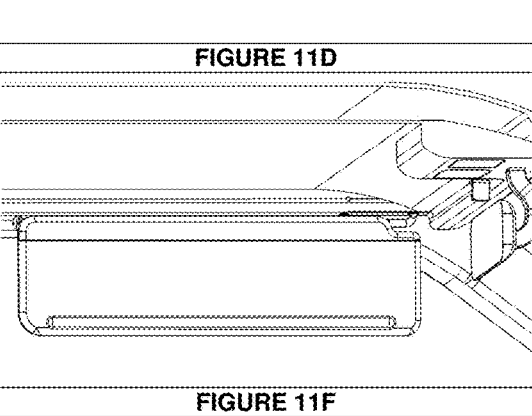
FIG. 11F illustrates the motorized visor panel at the window side of the vehicle.

FIG. 11-11G—Embodiment

An embodiment of like structure of the MVV invention in FIGS. 11 to 11G is an integrated visor system that is at rest, contract or expand changes the size of the width, with the motioning of the Extended Section [202]; which motion is normal from the Main Round Bar [222] shaft. The integrated visor system is held in place from horizontal angular motion with the Round Cylinder Screw [228] and Release Handle [260] of the solenoid actuating system when at rest and/or pivot motion towards or away from the windshield. At the release of Release Handle [260], the integrated vehicle visor is free to motion at horizontal angular motion, which motions to the side window for shading application.

FIG. 12—Embodiment

An embodiment of like structure of the MVV invention in FIG. 12 is a three-dimensional color rendering of the integrated vehicle visor system in application mode for optimal shading, where the Extended Section [202] motion normal from the Main Round Bar [222] shaft. The Main Round Bar [222] shaft at one end connects to the Angle Round Bar [220] that inserts into the Motor Mount [210] which houses the Motor and Pinion Gear [218] along with the Bevel Gear [216], followed by the Round Bar Spacing [214] and Round Bar Lock Ring [212] and the other end is held by the Release Handle [260] which disengages the Round Cylinder Screw [228] when operation is in motion.

Operations—FIGS. 1, 3 to 6, 9, 11A to 11G

The Motorized Vehicle Visor can be operated manually and/or with a controller, is an integrated vehicle visor systems that partitions into three visor panels from the exterior, the Extended Section [202], Mid Section [204], and the Pivot Section [206]. The Extended Section [202] allows for expanding or truncating the width of the visor for shading operation. The integrated vehicle visor, when in operation, pivots away from the roof towards and/or away from the windshield. There are three motorized motions and a solenoid actuating system motion; which starting from the integrated visor systems, the Motor Mount [210] affixed at the inside of the roof and windshield corner area of the visor, where the motor controls the angular horizontal motion or parallel roof plane of the visor using a Bevel Gear [216], Motor and Pinion Gear [218] system to pivot about the angular horizontal motion or in parallel to the roof plane.

The next motorized motion is within the Main Frame [200] of the integrated vehicle visor, where the Direct Mount Track [230] system composing of two direct motor drive systems are used. Which system comprises of the Direct Motor and Pinion [231] and Connector Gear and Post [233], which mounts directly to deliver motion at about the Main Round Bar [222] shaft implementing the Main Bar Gear [224] for traction to stay put when controlled to various position. About the exterior of the Main Frame [200], covers the Pivot Section [206], Mid Section [204], and Extended Section [206] of the integrated vehicle visor for aesthetic appearance.

The Extended Section [206] promotes the expanding and contracting width of the integrated visor, there introduces the third motorized system within the Main Frame [200], at about mid center of the integrated visor system. Implementing two extending motorized system on both sides symmetrical to each other at a nominal range apart, the Extend Motor Track [240] and component system harness a belt drive of Timing Belt Gear [243], Timing Belt [244], and Timing Belt Gear Mount [245]. Which Timing Belt Grip [251] harness the Extend Bar Travel Bar [252] to provides lateral motion or traveling within the Main Frame [200] width, thus extends the integrated visor system for shading application. The Extended Section [206] covers over the Extended Frame [250] to provide esthetic appearance to integrated visor system or Motorized Vehicle Visor.

The last set of motorized is lateral motion of the solenoid actuation system, which function allows for one of the Main Round Bar [222] shaft ends, containing the Round Cylinder Screw [228] to disengage when operation of the integrated vehicle visor is to motion towards the window side for shading application. The nature of the Round Cylinder Screw [228] of the integrated vehicle visor is held stationary, when in operation, the Release Handle [260] disengages. The Solenoid Rod [265] triggers the Release Handle [260] by the Solenoid Coil Actuator [264] when electricity is applied through the coils. There are two methods operating the Release Handle [260], one from the controller sends electric signal to disengage; the second is manual operation, a physical activity of releasing the handle by direct hand motion.

CONCLUSION

The Motorized Vehicle Visor invention is to improve the already existed Patent No.: 10,308,098, which previous design, the visor partitions in vertical segment, allows for the partitions to telescope along the suspending round bar harness and affixed to the interior roof of the vehicle. The new design partitions in a horizontal format into three segments, the Extended Section [202], Mid Section [204], and Pivot Section [206] to deliver a slim width integrated vehicle visor. Such approach was to effectively for pivoting the visor to the window side of the vehicle. When in operation to the side window, the integrated vehicle visor end at the Round Cylinder Screw [228] is released from the solenoid actuating system to disengage Release Handle [260].

This invention application still contains the magnetic suspension as shown in FIG. 10 of the integrated vehicle visor to illustrate such feature may be still possible after further implement the application. Where some considerations for further observation may be in the vibrations of the vehicle, but with strong enough magnetism, the visor can stay put even through driving vibrations and/or rough terrain experience.

Adding into from previous design for future perspective, the visor can autonomously be programmed using the latest in Artificial Intelligence and/or machine learning technology. In this case, the integrated vehicle visor can be added with a microprocessor with Al capability that may allow for the machine to learn to motion from strong sunrays and the behavior of the operator sensitivity to light and/or study the inside of the eye, irises, pupils and control the shading position accordingly to pursue optimal efficiency by self maneuvering of the integrated visor or Motorized Vehicle Visor position.

I claim:

1. A motorized vehicle visor comprising;
   a visor panel system having a main frame and an extended frame;
   a motor drive system supported within the vehicle visor panel system;
   a supporting rod coupled to a roof of a vehicle and supporting the visor;
   wherein the motor drive system drives the visor panel system to simultaneously pitch from a windshield towards the roof about the supporting rod, to truncate in width by retracting an extended frame into a main frame, and to pivot towards to a side window about the supporting rod.

2. The motorized vehicle visor of claim 1, wherein the supporting rod includes a mounting end which is attached to the vehicle roof approximately at a corner between the windshield and the side window.

3. The motorized vehicle visor of claim 2, wherein the motor drive system further comprises:
   a direct drive motor located at the mounting end of the supporting rod configured to drive the visor panel system angularly from the windshield towards the side window, and from the side window towards the windshield, and
   a second direct drive motor located within the panel system and configured to extend and retract the extended frame into and out of the main frame.

4. The motorized vehicle visor of claim 1, wherein the visor panel system may pitch toward and away from a driver about the supporting rod when in a first position, and further may vertically truncate about its width while in the first position.

5. The motorized vehicle visor of claim 1, wherein the motor drive system drives the visor panel system to a position parallel with the roof of the vehicle into a non-operation position for non-use.

\* \* \* \* \*